(12) United States Patent
Hermansson et al.

(10) Patent No.: US 8,676,261 B2
(45) Date of Patent: Mar. 18, 2014

(54) BASE STATION FOR MOBILE COMMUNICATION SYSTEM

(75) Inventors: Bo Hermansson, Farsta (SE); Anders Järleholm, Sollentuna (SE); Johnny Hederoth, Spånga (SE); Thomas Bengt Lejon, Järfälla (SE); Mathias Johansson, Bromma (SE); Örjan Fall, Sollentuna (SE)

(73) Assignee: Andrew LLC, Hickory, NC (US)

( * ) Notice: Subject to any disclaimer, the term of this patent is extended or adjusted under 35 U.S.C. 154(b) by 1330 days.

(21) Appl. No.: 10/599,324

(22) PCT Filed: Mar. 23, 2005

(86) PCT No.: PCT/SE2005/000437
§ 371 (c)(1),
(2), (4) Date: Aug. 22, 2008

(87) PCT Pub. No.: WO2005/094102
PCT Pub. Date: Oct. 6, 2005

(65) Prior Publication Data
US 2009/0017869 A1    Jan. 15, 2009

Related U.S. Application Data

(60) Provisional application No. 60/521,285, filed on Mar. 26, 2004.

(30) Foreign Application Priority Data

Mar. 26, 2004  (EP) ..................................... 04445038

(51) Int. Cl.
*H04M 1/00* (2006.01)
*H04B 1/38* (2006.01)
*H04B 1/034* (2006.01)
*H04B 1/08* (2006.01)

(52) U.S. Cl.
USPC ....... 455/561; 455/575.1; 455/90.3; 455/128; 455/347; 455/403

(58) Field of Classification Search
USPC ............... 455/561, 575, 90, 403, 575.1, 90.3, 455/128, 347, 558
See application file for complete search history.

(56) References Cited

U.S. PATENT DOCUMENTS 5,394,459 A * 2/1995 Djuphammar et al. .... 379/15.01
5,771,468 A * 6/1998 Stein ............................. 455/561
(Continued)

FOREIGN PATENT DOCUMENTS

GB     1398570 A  *  6/1975
JP   2000-115833 A     4/2000
(Continued)

OTHER PUBLICATIONS

Japanese Office Action issued on Aug. 31, 2010 in corresponding Japanese patent application No. 2007-504921.

*Primary Examiner* — Olumide T Ajibade Akonai
*Assistant Examiner* — Dung Hong
(74) *Attorney, Agent, or Firm* — Mendelsohn, Drucker & Dunleavy, P.C.; Steve Mendelsohn (57) ABSTRACT

A base station (100) devised for indoor use in a WCDMA network, comprising a support unit (401) including a power supply unit (303), said support unit (401) being adapted to be attached to a support structure, and a complete base station unit (402) mechanically supported by said support unit.

20 Claims, 7 Drawing Sheets

(56) References Cited

U.S. PATENT DOCUMENTS

| | | | |
|---|---|---|---|
| 5,995,851 A | 11/1999 | Lim | |
| 6,126,128 A * | 10/2000 | Costa et al. | 248/278.1 |
| 6,160,699 A * | 12/2000 | Gibson et al. | 361/643 |
| 6,180,876 B1 * | 1/2001 | Holmes | 174/367 |
| 6,411,809 B1 * | 6/2002 | Haakana et al. | 455/446 |
| 6,640,110 B1 * | 10/2003 | Shapira et al. | 455/562.1 |
| 2003/0069959 A1 * | 4/2003 | Tse | 709/224 |
| 2004/0179342 A1 * | 9/2004 | Pritchard et al. | 361/715 |

FOREIGN PATENT DOCUMENTS

| | | |
|---|---|---|
| JP | 2000-165283 A | 6/2000 |
| JP | 2001-111436 A | 4/2001 |
| WO | 0106801 A1 | 1/2001 |

\* cited by examiner

BASE STATION FOR MOBILE COMMUNICATION SYSTEM

CROSS-REFERENCE TO RELATED APPLICATIONS

This application claims the benefit of the filing date of U.S. provisional application No. 60/521,285, filed on Mar. 26, 2004.

FIELD OF THE INVENTION

The present invention relates to a base station for use in third generation (3G) mobile telecommunications systems. In particular, the invention relates to a miniaturized base station for indoor use suited for implementation at hotspots where many users are located in a relatively small area.

BACKGROUND

From the initial analog systems, such as those defined by the standards AMPS (Advanced Mobile Phone System) and NMT (Nordic Mobile Telephone), the cellular telephone industry has had an enormous development in the world in the past decades. In the past years, the development has been almost exclusively focused on standards for digital solutions for cellular radio network systems, such as D-AMPS (e.g., as specified in EIA/TIA-IS-54-B and IS-136) and GSM (Global System for Mobile Communications), generally referred to as the second generation of mobile communications systems.

Currently, the cellular technology is entering the $3^{rd}$ generation, also denoted 3G. WCDMA (Wideband Code Division Multiple Access) is by far the most widely adopted 3G air-interface technology in the new IMT-2000 frequency bands. Standardized by 3GPP (Third Generation Partnership Project) and ITU (international Telecommunication Union), WCDMA has gained broad acceptance within the wireless communication industry. By 2005, there is expected to be close to 100 WCDMA networks in operation globally.

From the outset, WCDMA was designed to provide cost-efficient capacity for both modern mobile multimedia applications and traditional mobile voice services. One of the key benefits of the technology is efficient, flexible support for radio bearers, in which network capacity can be freely allocated between voice and data within the same carrier. WCDMA also supports both multiple simultaneous services and multimedia services comprising multiple components with different service quality requirements in terms of throughput, transfer delay, and bit error rate.

In WCDMA, user data is spread over a bandwidth of circa 5 MHz. The wide bandwidth supports high user data rates and also provides performance benefits due to frequency diversity. However, the exact data transmission speed that will be available for the system users is not easily predictable. The actual capacity in the mobile networks is affected by a number of factors, such as weather conditions, how many users currently communicate through a common base station, and, most importantly, the cell density and the radio traffic channel density. In the terminology for WCDMA, a radio base station is referred to as a Node B.

A general object is to reduce the installation/operation/maintenance cost of base stations when designing/building/operating a cellular radio network.

While large macro radio base stations provide both high capacity and coverage over wide areas, a Pico Node B is designed to enhance the capacity and serves an additional number of (indoor) users within a relatively small coverage area in comparison with the coverage of a macro cell. Thus, Pico Nodes B are normally used in 3G systems as auxiliary base stations to decrease the traffic load for macro base stations on geographically restricted areas, often referred to as a hot spot areas. A Pico Node B can also be used to cover white spots where macro base stations do not provide satisfactory radio coverage. A Pico Node B may also be used to increase the capacity in local indoor hot spots and offices, and thereby improve the overall quality in the UMTS radio network by offloading the existing macro-based network.

Conventional fire and burglar alarms normally communicates with a central alarm station through the telephone network. A general problem is that telephone connection jacks are not always accessible where these alarms are desirable.

SUMMARY OF THE INVENTION

The present invention has as an object to solve/mitigate/overcome above problems.

According to a first aspect, the invention provides a base station devised for indoor use in a WCDMA network, comprising a support unit including a power supply unit, said support unit being adapted to be attached to a support structure, and a complete base station unit mechanically supported by said support unit. An advantage is that said complete base station unit can be designed as a compact light weight unit easy to carry.

In one embodiment, said complete base station unit is designed as a separate docking unit locked in said support unit by cooperating snap locking means arranged in said support unit and base station unit, thus allowing an easy installation/removal of said complete base station unit in/from said support unit.

In one embodiment, said power supply unit housed in said support unit comprises an AC/DC converter feeding said complete base station unit with a DC-voltage. An advantage is that said DC-voltage can be relatively low, e.g. 12V, so that the complete base station unit can be designed for a low voltage level.

In one embodiment, said base station unit has a sandwich structure comprising a rigid metal back plate, a rigid metal front plate, and a main circuit board attached intermediate said back plate and front plate. This allows a compact, low weight design and an efficient method of production.

In one embodiment, said rigid metal back plate comprises cooling flanges, which in one embodiment are arranged on the side facing away from said circuit board. In this way, said main circuit board is cooled by means of self-convection through said back plate.

In one embodiment, all circuits of a control processing block, a base band processing block and a RF block are arranged on said main circuit board. This provides a compact design and an efficient method of production.

In one embodiment, said main circuit board comprises border portions dividing the main circuit board in sections with separate circuits for said blocks, and where said front plate comprises inner walls with end portions engaging said border portions. In this way, said separate circuits are electromagnetically shielded from each other.

In one embodiment, a transmission interface block is realised in form of a separate circuit board, which is attachable to the main circuit board by means of a contact interface. An advantage is that this design allows an easy substitution of said circuit board, in case of future updates of transmission standard and/or in case of circuit board failure.

In one embodiment, said support unit comprises support members and said base station unit comprises cooperating hanger members which are devised to connect to said support members in a pivoting engagement, and wherein said snap locking means are included in said support unit and in said base station unit, which are devised to engage with each other by pivoting said base station unit. This allows a fast and easy installation/removal of the base station unit.

In one embodiment, said snap locking means are fowled by an inwardly projecting knob on a side wall of the support unit, and a cooperating recess in the base station unit, wherein engagement of the knob and the recess locks said base station unit from moving vertically upwards and horizontally outwards from the support unit.

In one embodiment, said snap locking means are realised by means of spring-loaded engaging means arranged on a side wall of said support unit and a cooperating recess in a side wall of said base station unit.

This means that the base station unit is safely secured in the support unit and at the same time allows an easy manual removal of the base station unit from the support unit.

In one embodiment, said base station comprises at least one interface for connecting an external alarm equipment with the control processing circuit of said base station, thereby allowing the establishment of a communication channel between said external alarm equipment and a central alarm station.

In one embodiment, said base station unit comprises a handle. This means that said unit can be deigned as a suitcase easy to carry around.

In one embodiment, said handle is arranged on the lower end of said base station unit, when the base station unit is installed in said support unit, and said handle further comprises a cable race groove. This allows for an easy and fast manual installation and a reduced risk of cable contact failure.

In one embodiment, a cable contact of said base station is positioned at the lower end of said base station, when the base station unit is installed in said support unit under said handle and tilted about 45 degrees. This allows for an easy and fast manual installation and a reduced risk of cable contact failure.

In one embodiment, said base station comprises an internal antenna covered by a front cover of an electromagnetically transparent material. This allows a compact design and facilitates the installation of the base station.

According to a second aspect, the invention provides a base station devised for indoor use in a WCDMA network, comprising a base station unit having an interface for connection to a power supply, a radio network controller, RNC, and to an antenna, said base station unit having a sandwich structure comprising a rigid metal back plate, a rigid metal front plate, and a main circuit board attached intermediate said back plate and front plate.

In one embodiment, said rigid metal back plate comprises cooling flanges.

In one embodiment, said cooling flanges are arranged on a side facing away from said circuit board, and thereby cooling said main circuit board by means of self-convection of said back plate.

In one embodiment, all circuits of a control processing block, a base band processing block and a RF (Radio Frequency) block are arranged on said main circuit board. This provides a compact design and efficient method of production. Furthermore, a detachable transmission interface block, e.g. in form of a separate circuit board, may be connected to said main circuit board. A voltage feeding DC/DC block is also arranged on said main circuit board.

In one embodiment, said main circuit board comprises border portions dividing the main circuit board in sections with separate circuits for said blocks, and where said front plate comprises inner walls with end portions engaging said border portions, thereby shielding said separate circuits from each other.

In one embodiment, said front plate comprises a mechanical interface for attaching an internal antenna, wherein said antenna is covered by a front cover of an electromagnetically transparent material. This gives a compact design.

In one embodiment, the control processing block and Radio Frequency block of said main circuit board are arranged in separate shielded compartments formed between said front plate and back plate, whereby said control processing block and Radio Frequency block are electromagnetically shielded from other electric circuits of the base station.

In one embodiment, also said base band processing block, transmission interface block and DC/DC block of said main circuit board are arranged in separate shielded compartments formed between said front plate and back plate, whereby said control processing block, Radio Frequency block, base band processing block, transmission interface block and DC/DC block are electromagnetically shielded from each other and other electric circuits of the base station.

In one embodiment, a transmission interface block of said base station is realised on a separate circuit board, which is attachable to the main circuit board by means of a contact interface, thereby allowing the easy substitution of said circuit board.

In one embodiment, said circuit board, a base band processing block and a DC/DC block of said circuit board, are arranged in separate shielded compartments formed between said front plate and back plate, and whereby said circuit board, base band processing block and DC/DC block are electromagnetically shielded from other electric circuits of the base station.

According to a third aspect, the invention provides a cellular radio network, including one or more macro base stations, wherein said network further comprises a base station according to any of above aspects.

According to a fourth aspect, the invention provides a method for assisting the installation of a base station for indoor use in a WCDMA network, which base station comprises a support unit including a power supply unit, and a complete base station unit mechanically supported by said support unit, comprising the steps of:

mechanically attaching said support unit to a support structure;

mechanically attaching said base station unit to the support unit;

connecting the base station unit to a radio network controller, RNC, of said network, to an antenna, and to said power supply unit; and downloading application software and office data from a management tool to said base station unit, allowing the establishment of a communication channel between said base station unit and said RNC.

In one embodiment, said step of mechanically attaching said base station unit to the support unit comprises the following step:

docking said base station unit by engaging cooperating snap locking means arranged in said support unit and said base station unit.

In one embodiment, said step of mechanically attaching said base station unit to the support unit comprises the following steps:

engaging hanger members of said base station unit with cooperating support members of said support unit, and, pivoting said base station unit into engagement of cooperating snap locking means arranged in said support unit and said base station unit.

In one embodiment, said method comprises further the steps of:

connecting an external alarm equipment to said base station unit, downloading specific software for said external alarm equipment to the control block unit of said base station unit, allowing the establishment of a communication channel between said alarm equipment and a central alarm station.

In one embodiment, said method further comprises the step of:

connecting said management tool directly to said base station unit by means of a Local Management Tool, for direct downloading of said application software and office data to the base station unit.

In one embodiment, said method further comprises the step of:

connecting said management tool to a central radio network controller, RNC, of said network, for downloading of said application software and office data to the base station through said network.

According to a fourth aspect, the invention provides a method for assembling a base station unit according to above 2:nd aspect, wherein said method comprises the steps of;

placing the back plate on an assembly support;
placing the circuit board on the back plate;
attaching the circuit board to the back plate;
placing the front plate on the circuit board; and
attaching the front plate to the back plate.

BRIEF DESCRIPTION OF THE DRAWINGS

The features and advantages of the present invention will be more apparent from the following description of the preferred embodiments with reference to the accompanying drawings, on which FIG. 1 schematically illustrates the network architecture of a RAN (Radio Access Network) according to an embodiment of the invention.

DETAILED DESCRIPTION OF PREFERRED EMBODIMENTS

An embodiment of the present invention relates to a telecommunications network including a base station intended for use in indoor environment to enhance coverage and increase capacity. The proposed base station is a low power, high capacity Node B optimized for indoor use, i.e. small size, low weight and possibilities to mount the Node B on a wall or in a ceiling. An optional front cover is available to ensure that the bases station blends into the environment where it its installed. The base station is noise free due to self-convection cooling. The compact base station according to the present invention as described herein will be referred as a Pico Node B 100 base station.

The Pico Node B 100 is excellent for:

Coverage enhancements, i.e. to cover white spots (an area where no coverage is supported by macro bases);

Adding Capacity in local indoor hot spots, e.g. in airport terminals, shopping malls, offices, train and subway stations;

Providing localized coverage and capacity in office environments for both voice and high-speed data service;

Improving overall quality in the Radio Network by offloading the macro network.

Figure 1:
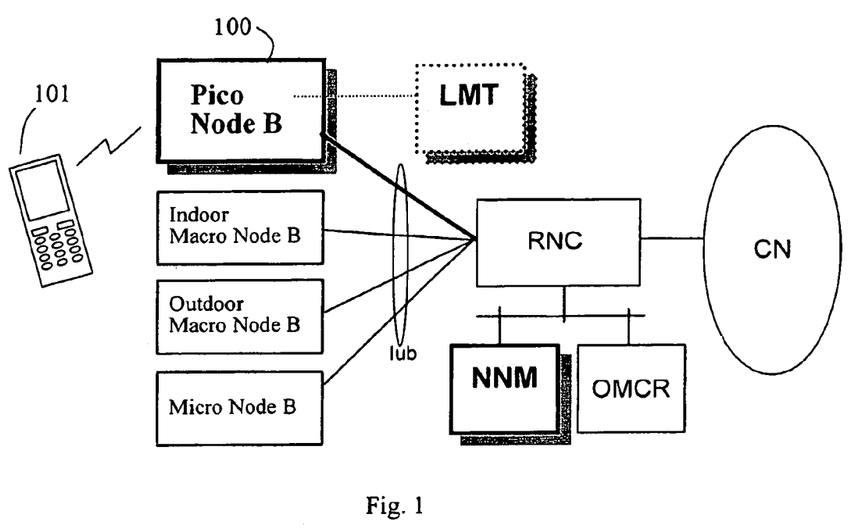

FIG. 1 illustrates the RAN (Radio Access Network) of a telecommunications system in which a base station 100, also referred to as Pico Node B 100, according to the present invention is included. As is indicated to the left in the drawing, the Pico Node B 100 is devised to act as one of a plurality of radio base stations, Node B's, in a common network. Such a plurality of base stations may include indoor macro Node B's, outdoor macro Node B's, and micro Node B's. The Node B's, including base station 100, are devised for radio communication with radio communication terminals 101. The Node B's are connected to an RNC (Radio Network Controller) over an interface Iub, which is the Node B-RNC interface according to 3GPP. The RNC is in turn connected to the CR (Core Network). An LMT (Local Management Tool), which will be further described below, may also be coupled to the Pico Node B 100. An NNM (Node B Network Manager) is remotely connectable to the Pico Node B 100 through the RNC, and provides central operation and maintenance functions like supervision, software upgrade and alarm handling. Extensive internal hardware and software supervision is part of the Pico Node B 100 functionality. Remotely ordered self-test capabilities are also included.

According to the invention, the Pico Node B 100 is a complete 3GPP/FDD Node B. The Pico Node B 100 supports one carrier and one sector with soft handover together with other Node B's in the radio network. The Pico Node B 100 is optimized for indoor use and is designed accordingly, i.e. low power and high capacity, to be able to serve a large number of indoor users within a limited coverage area. As stated the Pico Node B 100 connects to the RAN, such as UTRAN (UMTS Terrestrial Radio Access Network), system using the Iub interface. Receiver diversity is used together with either an internal antenna or external antennas. The Pico Node B 100 includes a duplex filter (receiving/transmitting filter), and no external duplex filters are needed when using external antennas.

Figure 2:
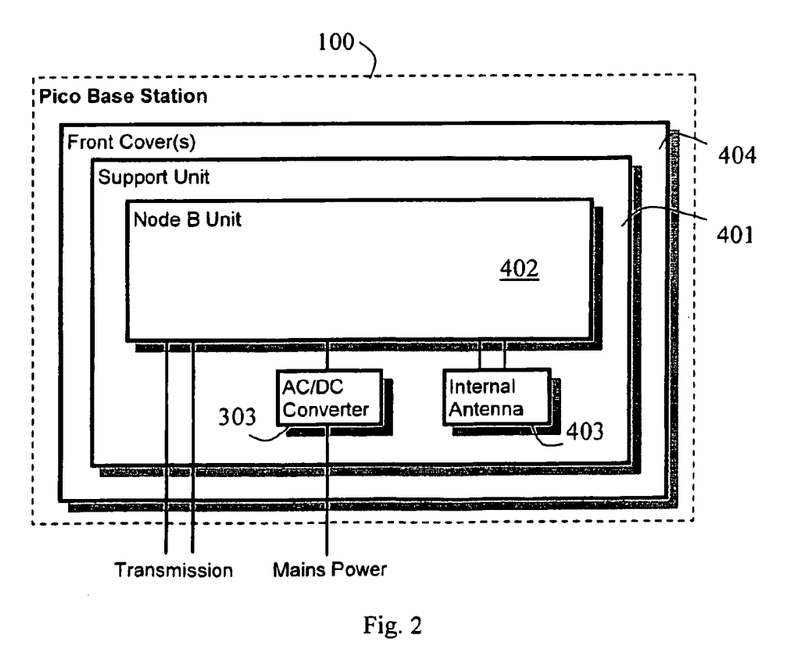
FIG. 2 schematically illustrates the modular concept of a base station devised according to an embodiment of the invention.

FIG. 2 illustrates the modular concept of the base station, the Pico Node B 100, according to the present invention. In the modular concept of the Pico Node B 100 a Node B Unit (NBU) 402 is the main building block. A support unit 401 serves as a mounting frame for the NBU 402 and different standards of power supply. The support unit can also be customized to house other external units, e.g. relating to fire and/or burglar alarms. An internal antenna is optionally included in the concept in order to provide a discrete site installation, and is attachable and electrically connectable directly to the NBU 402. When instead configured with external antennas, a wide variety of antenna types can be connected. The antenna choice is depending on the specific installation environment. Simple directional or omni-directional standard antennas are typically used. Distributed Antenna Systems can also be used together with the Pico Node B 100.

Figure 4:
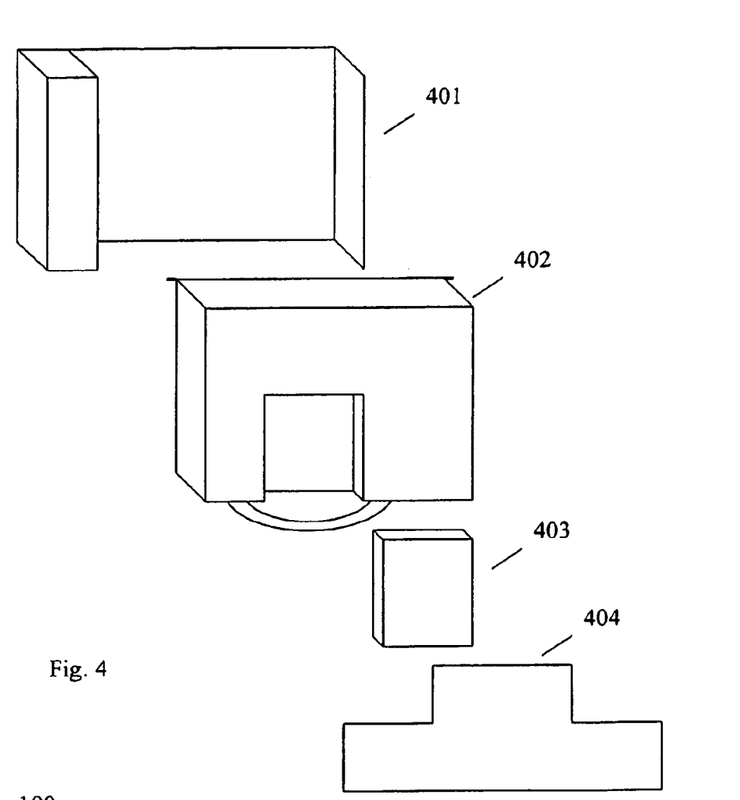
FIG. 4 schematically illustrates the different physical modular components of a base station devised according to FIG. 2.
Figure 5:
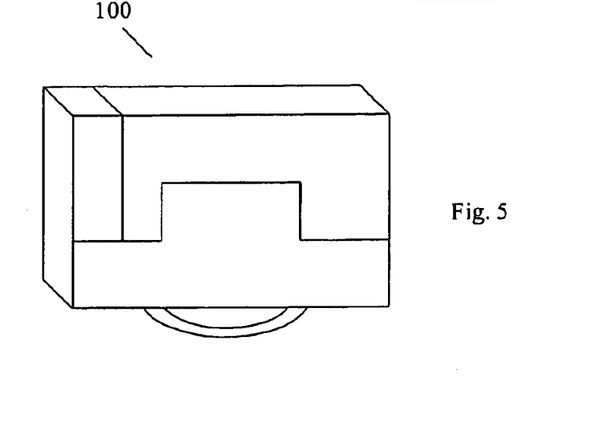
FIG. 5 schematically illustrates the assembled base station devised according to FIG. 4.
Figure 6:
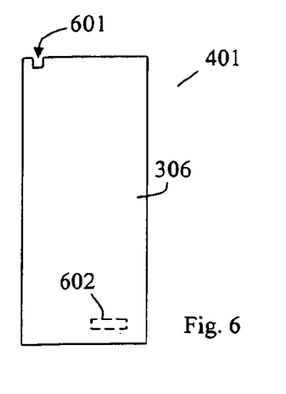
FIG. 6 schematically illustrates the support unit of FIGS. 3A and 3B from a side view.
Figure 7:
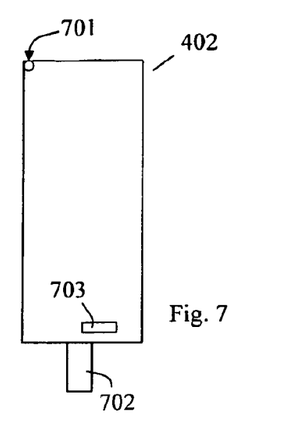
FIG. 7 schematically illustrates a base station unit according to an embodiment of the invention, from a side view.

FIG. 4 illustrates the modular components of an exemplary embodiment of the Pico Node B 100. In this standard configuration the Pico Node B 100 comprise a Node B Unit 402, an internal antenna 403, a support unit 401 including a power supply unit 303 with an AC/DC converter and internal cables, and a front cover 404. In FIG. 5 the Pico Node B 100 has been assembled into a complete base station. The internal antenna 403 is thus covered by a front cover 404, which according to the invention is made of an electromagnetically transparent material, e.g. plastic.

Preferred embodiments of the assembly and installation procedure is described further down.

Figure 10:
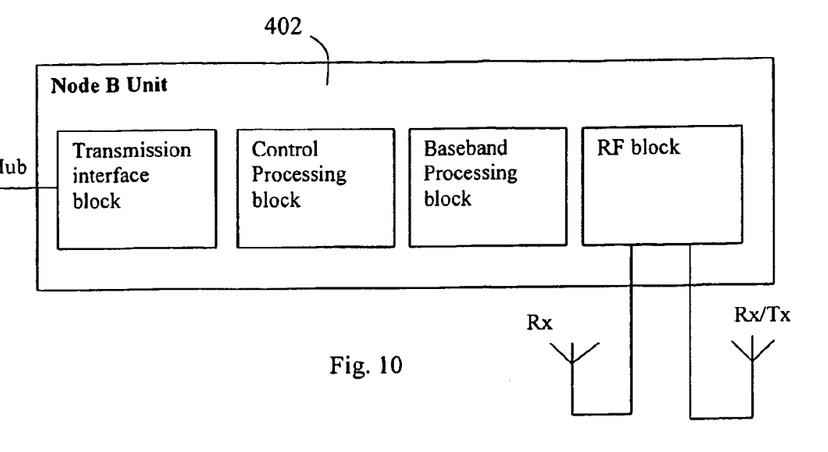
FIG. 10 schematically illustrates a functional block overview of a base station according to an embodiment of the invention.

The Node B Unit 402 has a complete 3GPP/FDD (Frequency Division Duplex) Node B functionality with all function blocks in one single hardware unit. A function block overview of the Node B Unit 402 is illustrated in FIG. 10. A preferred embodiment of the Node B Unit 402 comprises the following functional elements:

Transmission interface block.
This block handles the physical layer and ATM (Asynchronous Transfer Mode), IP (Internet Packet) and UMTS protocols and the Iub interface to RNC.

Control processing block.
This block handles the NBAP (Node B Application Part protocol), O&M functions, call control and clock reference synchronization.

Base band processing block.
This block handles transport channels, physical channels and air interface (layer 1).

RF block.
This block handles the TRX functionality, i.e. channel filters, AD and DA conversion, TX and RX frequency conversion, transmit power amplifier and receiver low noise amplifier and RF filtering.

Table 1 below shows the main feature that a preferred embodiment of the Pico Node B 100 supports.

TABLE 1

| | |
|---|---|
| Physical Channel | P-CPICH, P-CCPCH, S-CCPCH, S-CH, AICH, PICH, PRACH |
| | DPDCH, DPCCH, DPCH |
| Transport Channel | BCH, FACH, PCH, RACH |
| | DCH |
| Channel coding | rate ½, rate ⅓ |
| | turbo cording |
| | interleaving across multiple radio frames |
| Bearer | Conversational Speech UL: 12.2 DL: 12.2 CS (AMR) |

TABLE 1-continued

| | |
|---|---|
| Service (CS) | Conversational Unknown UL: 64 DL: 64 CS (UDI) |
| Bearer | UL: 64 DL: 64 PS |
| Service (PS) | UL: 64 DL: 128 PS |
| | UL: 64 DL: 384 PS |
| Multi Call | AMR speech 12.2 kbps + Packet/UL: 64 DL: 64 kbps |
| | AMR speech 12.2 kbps + Packet/UL: 64 DL: 128 kbps |
| | AMR speech 12.2 kbps + Packet/UL: 64 DL: 384 kbps |
| Power control | Inner loop |
| | Outer loop |
| Handover | Inter cell |

Figure 11:
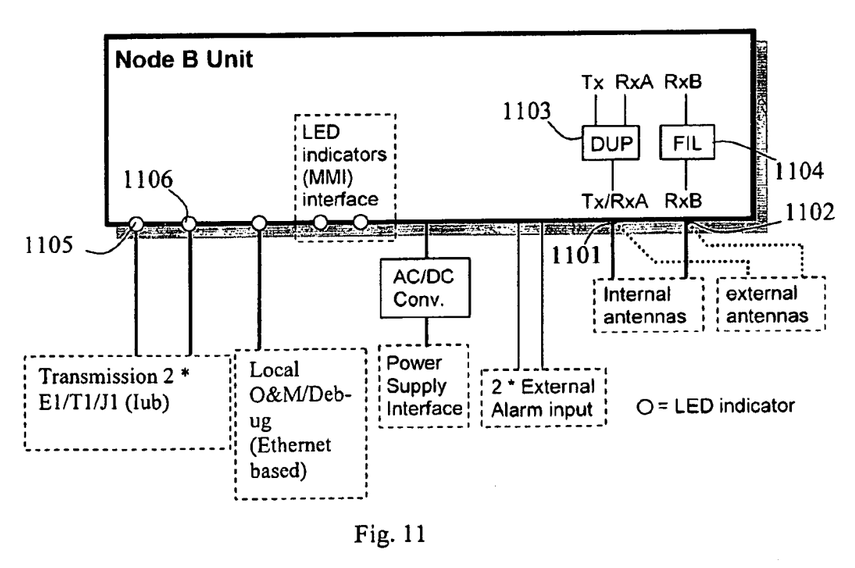
FIG. 11 schematically illustrates an interface of a base station according to an embodiment of the invention.

Both transmitter and receiver performance of a preferred embodiment of the Pico Node B 100 have been tested. Measurement methods and definitions are referring to 3GPP TS 25.104 v4.5.0 "BS Radio transmission and reception (FDD)" and 3GPP TS 25.141 v4.5.0 "BS conformance testing (FDD)". With reference to FIG. 11, reference point for testing was the two antenna connectors 1101, 1102 at the Node B Unit 402. One 1101 is connected to an internal duplex filter 1103 and thereby connected to the transmitter Tx and one of the receiver branches RxA. The other coaxial connector 1102 is connected to the other receiver branch RxB through a band pass filter 1104.

Table 2 shows the performance of the internal antenna, which is an optional feature.

TABLE 2

| Internal Antenna (Option) | |
|---|---|
| Gain | 6 dBi |
| Polarization | Dual Slant +/− 45° |
| Half Power Beam width | 70° |

The Transmitter performance is according to 3GPP TS 25.104 "BS Radio transmission and reception (FDD)". Table 3 below lists the most important parameters.

TABLE 3

| Transmitter Performance | | | |
|---|---|---|---|
| Frequency band | 2110-2170 MHz | | |
| Max Output Power | 300 mW, +/−2 dB | | |
| Frequency Accuracy | +/−0.05 ppm | | |
| Output Power Dynamics | Max code domain power | >−3 dB | |
| | Min code domain power | <−28 dB | |
| | Dynamic Range | >18 dB | |
| | Primary CPICH power | +/−2.1 dB | |
| Output RF spectrum emissions | According to spectrum mask P < 31 dBm in [1] Table 6.6 | | |
| | ACLR limit | 45 dB @ +/− 5 MHz | 50 dB @ +/− 10 MHz |
| Error Vector Magnitude | <17.5% | | |
| Peak Code Domain Error | <−33 dB at spreading factor 256 | | |

[1] 3GPP TS 25.104 v4.5.0 "BS Radio transmission and reception (FDD)"

The receiver performance fulfils requirements stated in 3GPP TS25.104 104 "BS Radio transmission and reception (FDD)" for DCH uplink (Chapter 8.1-8.5) and for RACH (Ch. 8.7), for radio propagation conditions applicable for pico-cells. The Pico Node B 100 Receiver Performance is illustrated in table 4 below.

TABLE 4

Receiver Performance

| | |
|---|---|
| Frequency band | 1920-1980 MHz |
| Sensitivity level | −121 dBm |
| Dynamic range | −18 dB |
| Adjacent channel selectivity | 63 dB |
| Blocking | In band 75 dB |
| | Out of band 100 dB |
| Intermodulation | In band 67 dB |
| Spurious emission | According to [1] Table 7.7 in the document "3GPP TS 25.104 v4.5.0 'BS Radio transmission and reception (FDD)'" |

In order to optimize the Pico Node B 100 receiver for indoor pico cell applications, the following restrictions are preferably made.

Cell range<1000 m, implying e.g. limited capture window for PRACH to 0-1000 m and limited capability to handle multi-path fading>2 μs Vehicle speed<120 km/h Compared to requirements in TS25.104 Annex B, the following restrictions listed in table 5 preferably apply.

TABLE 5

| | | |
|---|---|---|
| B.1 | "Static propagation condition" | Without restrictions |
| B.2 | "Multi-path fading" | Restricted to cases where both Max Doppler ≤120 km/h Max ray delay ≤2 μs This translates to the table 6 below |
| B.3 | "Moving propagation" | Restrict parameter A to 1 μs; A defined according to the document "3GPP TS 25.104 v4.5.0 'BS Radio transmission and reception (FDD)'" |
| B.4 | "Birth-Death propagation" | Restrict the group of random delays from +−5 μs to [−1, 0, 1] μs |

Furthermore, multi-path fading propagating conditions are preferably applied with restrictions corresponding to a Picocell as listed in table 6 below. Cell radius is preferably restricted to 1000 m and speed to 120 km/h.

TABLE 6

| Case 1 3 km/h | | Case 2 | Case 3 120 km/h | | |
|---|---|---|---|---|---|
| Relative delay [ns] | Average power [SB] | 3 km/h, Max delay 20 μs | Relative delay [ns] | Average power [dB] | Case 4 250 km/h |
| 0 | 0 | Not applicable for indoor Picocell (ray delay to high) | 0 | 0 | Not applicable for indoor Picocell (speed to high) |
| 976 | −10 | | 260 | −3 | |
| | | | 521 | −6 | |
| | | | 781 | −9 | |

The installation and commissioning procedure of the Pico Node B 100 is divided into two parts that can be performed separately. It is also possible to install and configure the Pico Node B 100 standalone, i.e. without connection to the transmission network. When this connection is available later, the last parts of the commissioning can be performed remotely via the NNM without any additional site visit. Needless to say, it is a prerequisite that the Pico Node B 100 site location is determined, and that all relevant planning, e.g. transmission, power, external equipment, is performed.

The Pico Node B 100 has been intentionally designed for simple and fast installation. Returning to FIG. 4, a complete Pico Node B 100 site installation comprises a support unit 401 (including AC/DC and support cover); a Node B Unit (NBU) 402; an internal antenna 403 (optional); and a front cover 404. Furthermore, transmission and power cables have to be included, but are not shown in FIG. 4.

The first part of the Pico Node B 100 site installation is the mechanical mounting and connection of external cables, and this part mainly involves the support unit. The Node B Unit 402 can be brought to site at a later stage, e.g. at commissioning of the Pico Node B 100. The support unit, including an AC/DC unit, is mounted on the location chosen. Standard installation is wall mounting. However, installation kits for ceiling and pole mounting are also possible. Complete installation requires a power cable, e.g. of 100 VAC, and transmission cables, preferably one or two twisted-pair cables with RJ45 connectors, depending on capacity need. If external antennas are used, RF cables with SMA connectors may also be included.

Figure 3A:
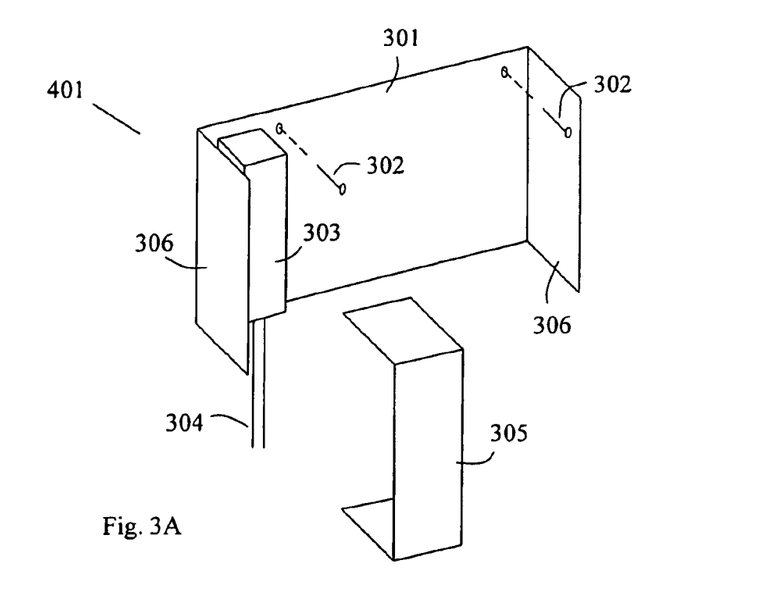
FIGS. 3A and 3B schematically illustrate a support unit of the base station according to an embodiment of the invention, disassembled and assembled.
Figure 3B:
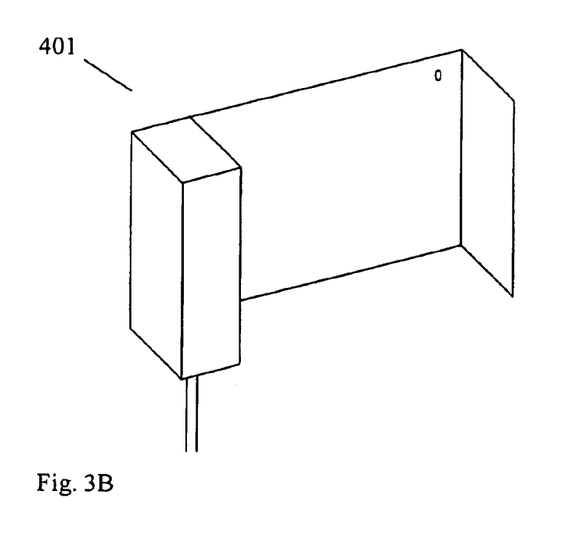

FIGS. 3A and 3B illustrate the support unit 401, which will serve as a mounting frame for the Node B Unit 402, as well as the housing of external units such as the AC/DC converter. A preferred embodiment of the Pico Node B 100 according to the present invention makes use of a supply voltage of about AC 100-230 V+/−10% 50/60 Hz, and has a maximum power consumption of <100 W. In a preferred embodiment, the output voltage level from the AC/DC is about 12 V, which gives the advantage that the complete base station unit (node B unit 402 in FIG. 10) can be designed and approved for a low voltage level, i.e. of 12 V in this embodiment, while the support unit (401) becomes a standard 100-230 V unit. The standard support unit 401 is used for vertical wall installation, and comprises a plate member 301 having a flat main portion devised to be fitted against a wall e.g. by means of screws 302, bolts, nails or the like. The plate member 301 further includes side wall members 306, extending perpendicular from main portion, as illustrated. AC/DC converter 303 is attached to the main plate member 301, adjacent to a side wall member 306. Power cables 304, which do not form part of the support unit 401 as such, are connected to converter 303 from below. In one embodiment, an additional side wall member may be included, defining a second side wall for a compartment for AC/DC unit 303 of the support unit 401. A support cover 305 is preferably an aluminium part that is used to cover the power supply 303. FIG. 3B illustrates support unit 401 when assembled with its cover 305. The external power line is connected to the AC/DC unit in the support unit. This may either be a fixed installation or be connected using a cable with a plug connected to a wall outlet.

Figure 8:
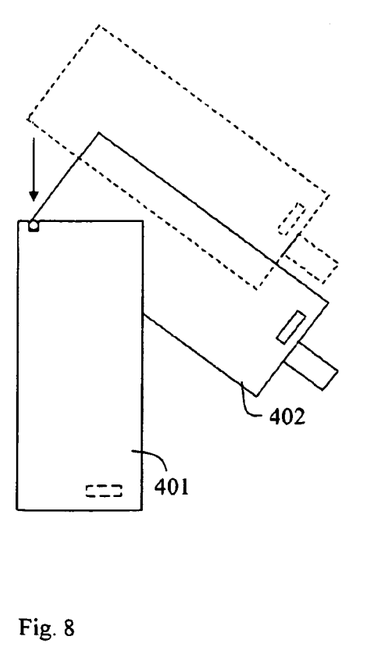
FIG. 8 schematically illustrates a first step of attaching the base station unit of FIG. 7 to the support unit of FIG. 6.
Figure 9:
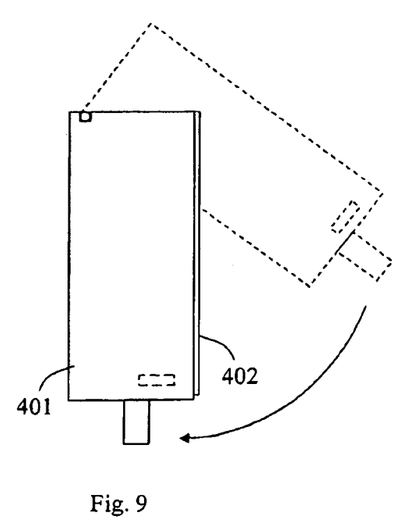
FIG. 9 schematically illustrates a second step of attaching the base station unit to the support unit.

Mounting of the Node B unit (NBU) 402 to support unit 401 is preferably performed as illustrated in FIGS. 6 to 9. The support unit 401 is shown in a side view in FIG. 6, and comprises hanger means at an upper portion of the support unit, e.g. in the form of recessed portions 601 formed in side wall members 306, which recesses are open from above. The NBU 402 is shown in a side view in FIG. 7, which it is shown that an upper portion of NBU 402 comprises cooperating hanger means 701, preferably in the form of sideways projecting pins 701, see also FIG. 4. In another embodiment not illustrated in FIG. 6-9, said latch means are realized as snap locking means formed by substantially L-shaped projections on said support unit 401 and cooperating recesses in said base station unit 402, fitting together with said substantially L-shaped projections, thereby locking said base station unit 402 vertically upwards and horizontally towards said support unit 401. The side walls of the support unit 401 and/or the base station unit 402 may have elongated openings in order to render the side walls resilient during pivoting, and the projections may be chamfered for a smooth locking/unlocking. In still another embodiment not illustrated in FIG. 6-9, the snap locking means are realized by means of spring loaded engaging means, e.g. hat formed, arranged on the side walls of said support unit 401 and cooperating recesses in the side walls of said base station unit 402. This arrangement will also allow for a smooth and easy installation/removal of the base station (402). The handle 702 may be arranged with cable race grooves, in which the network cable, antenna cables, Ethernet cable for connecting a Local Management Tool, external alarm cables etc. may run. For instance, a bundle of cables may run from above in FIG. 5 along a side wall of base station 100, pass the lower edge of the base station unit 100 and be further drawn into the cable race grooves of the handle. The cables may then be attached upwardly into their respective interface contacts at the lower end of the base station, e.g. just under the handle. In order to reduce the risk of malfunctioning cable connections, the interface contacts positioned at the lower end of the base station are preferably tilted, e.g. 45 degrees. This design provides a compact and robust solution which also makes the installation work easier. The NBU 402 is designed to first be engaged with support unit 401 by placing projecting pins 701 at rest in recesses 601, while holding NBU 402 at an angle to support unit 401, as is illustrated in FIG. 8. For this purpose, a handle 702, which is also illustrated in FIG. 4, is particularly advantageous. NBU 402 is then pivoted about a rotation axis defined by pins 701, until latch means 602 on support unit 401 snaps into engagement with cooperating latch means 703 on NBU 402, as is illustrated in FIG. 9. In one embodiment, those latch means are available from the outer side of side wall members 306 of the support unit 401. In another embodiment a special tool is needed to unlatch the NBU 402 from support unit 401 in order to prevent stealing or tampering. It should be apparent that the described type of hanger means are purely exemplary. An alternative embodiment comprises backwards projecting hooks on the NBU 402, devised to be hung on edges or pins on the upper part of support unit 401. A pivoting function will be achieved with such a solution also. In another embodiment not illustrated in FIG. 6-9, said latch means are realized as snap locking means formed by substantially L-shaped projections on said support unit 401 and cooperating recesses in said base station unit 402, fitting together with said substantially L-shaped projections, thereby locking said base station unit 402 vertically upwards and horizontally towards said support unit 401. The side walls of the support unit 401 and/or the base station unit 402 may have elongated openings in order to render the side walls resilient during pivoting, and the projections may be chamfered for a smooth locking/unlocking. In still another embodiment not illustrated in FIG. 6-9, the snap locking means are realized by means of spring loaded engaging means, e.g. hat formed, arranged on the side walls of said support unit 401 and cooperating recesses in the side walls of said base station unit 402. This arrangement will also allow for a smooth and easy installation/removal of the base station (402). The handle 702 may be arranged with cable race grooves, in which the network cable, antenna cables, Ethernet cable for connecting a Local Management Tool, external alarm cables etc. may run. For instance, a bundle of cables may run from above in FIG. 5 along a side wall of base station 100, pass the lower edge of the base station unit 100 and be further drawn into the cable race grooves of the handle. The cables may then be attached upwardly into their respective interface contacts at the lower end of the base station, e.g. just under the handle. In order to reduce the risk of malfunctioning cable connections, the interface contacts positioned at the lower end of the base station are preferably tilted, e.g. 45 degrees. This design provides a compact and robust solution which also makes the installation work easier.

An internal antenna 403 may be mounted directly on the NBU 402, preferably mechanically attached be means of screws. A transmission cable or cables are preferably installed for connecting the antenna 403 to the NBU 402 antenna connectors 1101, 1102, see FIG. 11. If instead an external antenna is used, the external antenna or antennas and coaxial cables are installed, where said coaxial cables are terminated with SMA connectors connected directly to the Node B Unit 402 at 1101, 1102. Finally cover 404 is mounted. The first part, i.e. mechanical site installation, is then finalized.

The following steps of commissioning shall be performed to finalize the installation and take the Pico Node B 100 into operation.

The support cover is removed if this is a separate site visit. An internal cable for Power, DC output cable from the AC/DC unit to the Node B unit 402, is connected. The LMT (Local Management Tool) is connected to the Node B Unit 402 using a Local Ethernet based O&M interface of the NBU 402 for access at the Pico Node B 100 location. The Node B shall be loaded with the relevant revision of application software and Office Data for the particular Pico Node B 100 site using the LMT. This can be loaded at site or at the home office before the site visit. The Office Data may at least contain IP and ATM parameters to enable central operation & maintenance access to Node B. If external alarms are used they can be defined and configured by the following steps:

connecting the external alarm equipment to said base station unit (402), downloading specific software for said external alarm equipment to the control block unit (1404), allowing the establishment of a communication channel between said alarm equipment and a central alarm station.

After this software download is made, a test session is preferably performed, starting with a self test. If connection to the Transmission Network is available, a Transmission Network Test to check RNC communication, and O&M Network Test to check communication with NNM and other O&M nodes, are also performed. An RF Coverage Test is preferably also made, after which the front cover is mounted, covering the NBU interface. The Pico Node B 100 is then ready to be taken into operation.

The state of the art base stations used in WCDMA systems take days or even weeks to install. If an indoor Node B is to be installed, standard outdoor Node B equipment are used. Such base stations are extremely complex, space-demanding, and expensive. With the present invention, a Node B which is specifically suited for indoor use is provided, and which may be installed in less than an hour. Both time and cost for installation is saved, and the installed Node B is extremely compact and discrete. Due to the advantageous wall mounting capabilities, the Node B may be placed so that it hardly occupies any workspace at all. Furthermore, the modular design of the Pico Node B 100 makes it particularly advantageous to repair, by simple module replacement. The field replaceable units include the NBU 402, the AC/DC power supply, and the optional internal antenna. These may all be replaced in less than 30 minutes.

As mentioned, the Node B application software and office data can be installed to the Node B by NNM remotely or using LMT locally on site. MT pushes the new application package and/or office data to the Node B. The software installation is assisted by a Node B product inventory function, which ensures that new software is compatible with the existing Node B hardware. The compatibility check is carried out by NNM or LMT. Also upgrade of application software of the Node B is performed using the NNM or the LMT. The upgrade can be ordered or scheduled.

The main task of the NNM is to make the network wide management easier and faster by providing means to operate simultaneously towards multiple number of Node B's. The NNM can also be used for management of a single Pico Node B 100, so called Element Management. The NNM application can be run in different environments. According to embodiments the supported platforms include PC with Win2000 OS, standard PC (Pentium III, 512 MB RAM, 40 GB Harddrive, CPU clock speed 1 GHz); and SUN workstation with Solaris 8, Sun Fire 280 R The NNM comprises a number of functions:
Network Management Support:
 Topology view of Node B in order to make the simultaneous management of multiple Node B's possible;
 Detection and presentation of new Node Bs in the network; and
 Node B surveillance.
Configuration Management:
 Installation of Application Software/office data to Node B;
 Upgrade of Application Software/office data to Node B;
 Migration of office data;
 Node B Product Inventory support; and
 Status inquiry (executing application and interfaces)
Fault Management (Including External Alarms):
 Node B and NNM Alarm Presentation;
 Alarm storage (active alarm list and history log); and
 Alarm acknowledge.
Performance Management:
 Control of Performance Management (scheduling of measurement collection, transportation of measured data);
 Post Processing of Performance data; and
 Basic presentation of measured PM data.

Preferably, the NNM has a web-based GUI (Graphical User Interface), in that the NNM includes an HTTP server, which enables login from any terminal connected to the O&M IP Network.

The LMT is a mandatory installation tool for the Pico Node B 100. The LMT application may run on a standard laptop PC with Microsoft's Windows OS. The LMT installation support may include the following functions:
Downloading of Application Software and Office Data to Node B;
Installation tests for Node B;
Retrieval of status and alarm information from the Node B;
Configuration of External alarms.

The LMT PC is connected locally via local Ethernet based O&M interface.

The office data is data that can be changed by the operator. The office data includes data for transport-, radio- and IP networks. Also site dependent data shall be set, e.g. position information. It is assumed that office data for large networks are generated from network planning tools. The major part of the office data for Pico Node B 100s shall be inserted via the Network Node B Manager). The NNM provides a GUI for that purpose.

The basic communication office data may be loaded when the Node B is installed. This data opens the external management interface to Node B. This data is loaded into Node B with the LMT. Once the basic communication office data is inserted the rest of the configuration task can be carried out from a remote location using the NNM. A major part of the configuration parameters have factory default settings. However, not all configuration parameters can be factory default set e.g. IP address for end user network.

The following configuration areas require definitions of office data:
Transport Network;
Radio Network;
IP Network; and
Site data.

The ATM Transport Network Office data is required in order to set up the communication paths for user and control planes. The transport network consists of several layers that may be configured to establish the communication link. Both between the Pico Node B 100 and the management nodes (NNM, FTP server, etc) for O&M and between Pico Node B 100 and RNC for the traffic parts. The layers that are required to be configured are:
Physical layer;
ATM layer;
ATM Protocol layer.

For the Radio Network Office Data, the local Cell Identity requires office data definition.

As for the IP Network Office Data, it shall provide data for O&M IP network. The IP traffic is carried by ATM (IP over ATM).

Site Office data comprises both informative and operative data.

The Node B Unit 402 preferably has an external interface according to FIG. 11. With reference to that drawing, one embodiment of the NBU interface comprises:
 A transmission interface (Iub), which in this particular case is 2*J1 (IMA), but might as well be e.g. 2*T1 (MA) or 2*E1 (IMA), over a twisted pair cable and using ATM as transmission protocol. The particular transmission standard to be used by the Pico Node B, i.e. the Japanese J1 (IMA), the American T1 (IMA) or European E1 (IMA) standard, is configured during the installation of office data by choosing to run the software of the E1, T1 or J1 standard. There is also transmission connection LED indication (yellow) for each transmission line. Cable connectors 1105 and 1106 are included for connection to the network.
 An antenna (RF) interface, which has two antenna ports 1101, 1102, for RxA/Tx and RxB, respectively. A duplex filter 1103 and a band pass filter 1104 are included in Node B Unit 402. RxA and RxB are receive diversity branch A respective receive diversity B.
 A power supply interface. This interface is internal in Node B with a fixed connection to AC/DC converter depending on used site configuration. The internal Node B Unit 402 input is +12 V DC and the external power supply is e.g. 100 VAC (input Voltage to the AC/DC).
 A Local O&M/Debug interface, which complies with the Ethernet protocol standard. The Local Management Tool (LMT) is connected to this interface. There is also Local O&M connection LED indication (yellow).
 A LED Indicator (MMI) Interface, used for Power on LED indication (green) and internal fault status LED indication (red).
 An external alarm interface, which supports two external alarm inputs which can be defined and configured by the operator.

The external alarm interfaces allows the establishment of a communication channel between an external alarm equipment, e.g. fire or burglar alarm, and a central alarm station, i.e. a monitoring central and/or a server. The specific software for the external alarms to be installed in the control processing unit 1404 of the base station is obtained from the alarm supplier. Normally, a telephone number or an IP-address, along with the specific alarm communication software are stored in the processing unit 1404.

In order to make the Pico Node B 100 as compact and lightweight as possible, special features have been employed in the design of the NBU 402. This is illustrated in FIGS. 12-16.

Figure 12:
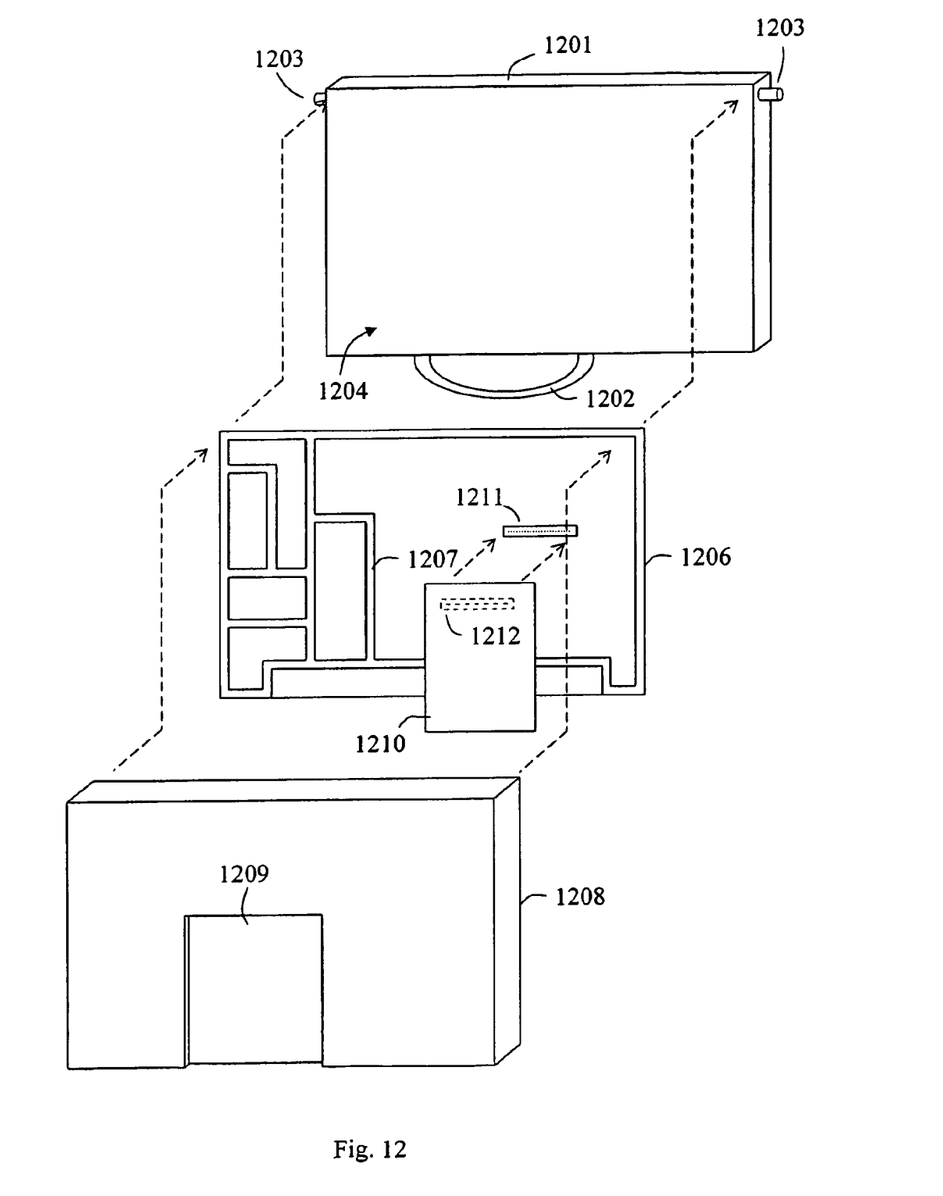
FIG. 12 schematically illustrates assembly of a base station unit according to a preferred embodiment of the invention.

In FIG. 12, the three main building blocks of the NBU 402 are illustrated. The NBU 402 comprises a back plate 1201, which includes a handle 1202 (corresponding to 702) as an integrated or attached member, and projecting pins 1203 (corresponding to 701). Back plate 1201 is a support member for a circuit board 1206, which is attached to the front side 1204 of back plate 1201, preferably by means of screws, rivets, an adhesive, or the like. Back plate 1201 is preferably made of metal, such as aluminium. The back side 1205 of back plate 1201 is further preferably arranged with cooling flanges, though not shown in FIG. 12.

Figure 13:
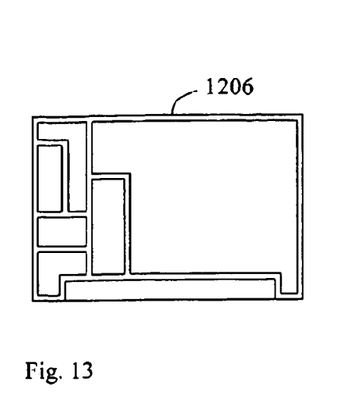
FIG. 13 schematically illustrates a circuit board for a base station unit according to a preferred embodiment of the invention.
Figure 14:
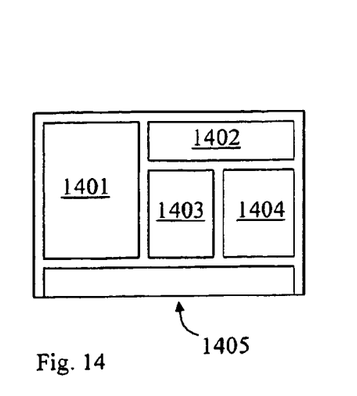
FIG. 14 schematically illustrates the functional layout for the circuit board of FIG. 13.

According to this preferred embodiment of the invention, all circuits of a control processing block, a base band processing block and an RF block are arranged on the main circuit board 1206. On FIGS. 13 and 14, the circuit board 1206 is shown again, in equal scale. FIG. 13 illustrates the physical structure of circuit board 1206, whereas FIG. 14 illustrates the functional layout. With reference to FIG. 10, and the associated description, circuit board 1206 comprises circuitry for the RF block 1401, the base band processing block 1402, and the control processing block 1404. The different functional elements in blocks 1401, 1402 and 1404 are powered through power supply unit 303, which provides a DC voltage. However, different voltage levels are needed for different functional elements, and different levels of accuracy are also required. For this purpose, an internal DC/DC block 1403 is preferably included on circuit board 1206. DC/DC block 1403 is consequently fed by power supply unit 303, and feeds the functional elements of the NBU 402 with electric power at adapted levels of voltage. The circuit board 1206 further carries the interface 1405, i.e. connectors and diodes, indicated in FIG. 11. Interface 1405 is preferably accessible from the lower side of circuit board 1206. As is further illustrated in FIGS. 12 and 13, different parts of the circuitry, in particular different parts of the RF block 1404, are separated from each other by intermediate border portions 1207. These border portions are formed of a conducting material layer, e.g. metal, and are devised to engage with shielding elements as will be explained further down.

In a preferred embodiment, circuitry for the transmission interface block is provided on a separate circuit board 1210, which is attachable to circuit board 1206 as illustrated in FIG. 12. In one embodiment, cooperating piggy back connectors 1211, 1212 on circuit boards 1206 and 1210, respectively, are used for connection. An advantage with having a separate transmission interface circuit board 1210, is that it is easy to adapt the Node B 100 to different transmission connection types to the RNC of the network. In one embodiment, transmission interface circuit board 1210 may be devised for E1 type transmission (European standard), and in a different embodiment to J1 transmission (Japanese standard), and in still another embodiment for T1 type transmissions (American standard). Furthermore, it is possible to provide specific transmission interface circuit boards 1210 for STM-1 type transmission over optical fibre instead of twisted wire, or even for SDSL over ordinary telephone lines. In a preferred embodiment, connectors 1105 and 1106 are carried on the transmission interface circuit board 1210.

Consequently, the inclusion of a separate detachable transmission interface circuit board 1210 provides flexibility to the base station 100, which otherwise may be identical regardless of selected transmission type. This is a clear advantage in terms of manufacture.

According to an embodiment of the invention, the assembly is designed such that cooling of the electronic circuitry is achieved by means of self-convection cooling. The elimination of moving mechanical parts, such as fans, advantageously reduces the risk for component failure due to wear of moving mechanical parts. It also advantageously reduces, or eliminates, the need for condition monitoring and maintenance of moving parts, such as cooling fans having ball bearings that are susceptible to mechanical wear. Hence, the design of the assembly so that cooling is achieved solely by air convection leads to an increased life-time for the base station, and it also reduces the costs for running the base station.

According to a preferred embodiment efficient self-convection cooling is achieved by designing the assembly such that all circuits apart from the transmission interface, are arranged on a single circuit board 1206, which is attached directly to back plate 1201, which back plate is provided with cooling flanges. The self-convection cooling advantageously makes the device noise free, due to the lack of any moving elements, such as cooling fans.

The NBU 402 further includes a front plate 1208, which is attached over circuit board 1206, as indicated in FIG. 12. Front plate 1208 is preferably attached by means of screws to the back plate 1201. Front plate 1208 comprises the mechanical interface 1209 to the optional internal antenna on its front side. In an alternative embodiment, the projecting pins 1203 devised for hanging the NBU 402 on the support plate, may be attached to front plate 1208 instead of the back plate 1201.

Figure 15:
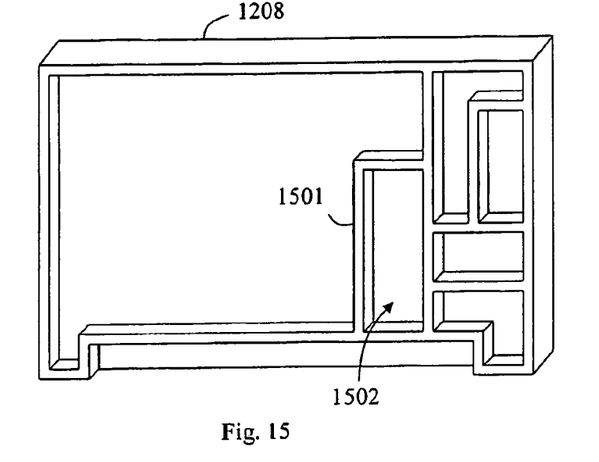
FIG. 15 schematically illustrates a front plate devised to be attached towards a circuit board as illustrated in FIG. 13.

FIG. 15 illustrates front plate 1208 from its back side, devised to face circuit board 1206. As is evident from this drawing, front plate 1208 comprises a pattern of separating walls 1501 on its back side, defining different separate compartments 1502, which pattern corresponds to the border portions 1207 of circuit board 1206. Preferably the entire front plate 1208 is made from a single piece of metal, such as aluminium. When front plate 1208 is attached over the circuit board 1206, the outer end portions of separating walls 1501 engage border portions 1207, thereby electrically enclosing the circuits arranged in the different compartments 1502. At the same time, dividing walls 1501 serve as support means for a mechanically rigid attachment towards the relatively large circuit board 1206, which ensures a secure assembly. In a preferred embodiment, though not specifically shown in the drawings, the outer side walls of front plate 1208 extend over the side edges of circuit board when the NBU 402 is assembled, either fully or at least a lip portion of the side walls, in order to fully enclose the circuit board 1206 in the NBU 402.

Figure 16:
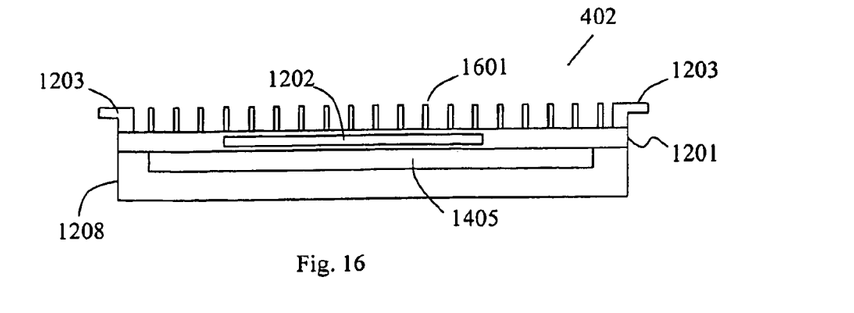
FIG. 16 schematically illustrates the assembled base station unit of FIG. 12, as seen from below.

FIG. 16 illustrates the assembled NBU 402 as seen from the lower side, in an embodiment of the invention. Back plate 1201 is illustrated with cooling flanges 1601 formed on its back side, i.e. the side which is devised to face the flat main portion of plate member 301 of support unit 401 when the entire Pico Node B 100 base station is assembled. It should be noted that cooling flanges may be formed in front plate 1208 instead, or in both plates 1201 and 1208. Furthermore, handle 1202 is shown, as well as projecting pins 1203. The circuit board 1206 is not visible, as it is enclosed between back plate 1201 and front plate 1208. However, the interface 1405 of the NBU 402, which is also illustrated for an exemplary embodiment in FIG. 10, is accessible for connection to the Iub, the power supply of the support unit, and the antenna, internal or external.

Due to the modular concept and the inventive design and assembly of the included elements, the base station is very compact. The dimensions and weight of the complete Pico Node B 100 including the front cover, i.e. as illustrated in FIG. 4, according to an of an embodiment of the invention are given in table 7 below. The given values consequently also include the power supply unit 303, as well as an internal antenna 403.

TABLE 7

| | |
|---|---|
| Width | 220-300 mm |
| Height | 420-500 mm |
| Depth | 90-95 mm |
| Weight | 5-10 kg |

The principles of the present invention have been described in the foregoing by examples of embodiments or modes of operations. However, the invention should not be construed as being limited to the particular embodiments discussed above, and it should be appreciated that variations may be made in those embodiments by persons skilled in the art, without departing from the scope of the present invention as defined by the appended claims.

The invention claimed is:

1. A base station devised for indoor use in a WCDMA network, comprising a support unit including a separately field replaceable power supply unit, said support unit being adapted to be attached to a support structure, and a complete base station unit mechanically supported by releasably hanging on, and from said support unit, said complete base station unit being designed as a separate docking unit releasably locked in said support unit by cooperating snap locking means arranged in said support unit and base station unit, allowing an easy and separate installation/removal of said complete base station unit in/from said support unit in the field, while, at the same time, enabling secure assembly of the complete base station unit preventing the complete base station unit from inadvertent movement during installation/removal on the field without the need of further fastening means;
   wherein said power supply unit housed in said support unit comprises an AC/DC converter feeding said complete base station unit with a DC-voltage;
   wherein said base station unit has a sandwich structure comprising a rigid metal back plate, a rigid metal front plate, and a main circuit board attached intermediate said back plate and front plate.

2. The base station according to claim 1, wherein said rigid metal back plate comprises cooling flanges.

3. The base station according to claim 2, wherein said back plate's cooling flanges are arranged on the side facing away from said circuit board whereby said main circuit board is cooled by means of self-convection through said back plate.

4. The base station according to claim 3, wherein said main circuit board comprises border portions dividing the main circuit board in sections with separate circuits for said blocks, and where said front plate comprises inner walls with end portions engaging said border portions for shielding said separate circuits from each other.

5. The base station according to claim 1, wherein all circuits of a control processing block, a base band processing block and an RF block are arranged on said main circuit board.

6. The base station as recited in claim 1, wherein it comprises a transmission interface block realised in form of a separate circuit board, which is attachable to the main circuit board by means of a contact interface, thereby allowing an easy substitution of said circuit board.

7. The base station according to claim 6, wherein said snap locking means are formed by an inwardly projecting knob on a side wall of the support unit, and a cooperating recess in the base station unit, wherein engagement of the knob and the recess locks said base station unit from moving vertically upwards and horizontally outwards from the support unit.

8. The base station according to claim 6, wherein said snap locking means are realised by means of spring-loaded engaging means arranged on a side wall of said support unit and a cooperating recess in a side wall of said base station unit.

9. The base station according to claim 1, wherein said support unit comprises support members and said base station unit comprises cooperating hanger members which are devised to connect to said support members in a pivoting engagement, and wherein said snap locking means are included in said support unit and in said base station unit, which are devised to engage with each other by pivoting said base station unit.

10. The base station according to claim 1, wherein said base station comprises at least one interface for connecting an external alarm equipment with a control processing circuit of said base station, thereby allowing the establishment of a communication channel between said external alarm equipment and a central alarm station.

11. The base station according to claim 10, wherein said handle is arranged on the lower end of said base station unit, when the base station unit is installed in said support unit, and that said handle further comprises a cable race groove.

12. The base station according to claim 1, wherein said base station comprises a handle at a side portion, allowing the base station to be carried.

13. The base station according to claim 12, wherein at least one cable contact is positioned at the lower end of said base station, when the base station unit is installed in said support unit, under said handle and tilted about 45 degrees.

14. The base station according to claim 1, wherein it comprises an internal antenna covered by a front cover of an electromagnetically transparent material.

15. A cellular radio network, including one or more macro base stations, wherein said network further comprises a base station devised for indoor use in a WCDMA network, comprising a support unit including a separately field replaceable power supply unit, said support unit being adapted to be attached to a support structure, and a complete base station unit mechanically supported by releasably hanging on, and from, said support unit, said complete base station unit being designed as a separate docking unit releasably locked in said support unit by cooperating snap locking means arranged in said support unit and base station unit, allowing an easy and separate installation/removal of said complete base station unit in/from said support unit in the field, while, at the same time, enabling secure assembly of the complete base station unit preventing the complete base station unit from inadvertent movement during installation/removal on the field without the need of further fastening means;
   wherein said power supply unit housed in said support unit comprises an AC/DC converter feeding said complete base station unit with a DC-voltage;
   wherein said base station unit has a sandwich structure comprising a rigid metal back plate, a rigid metal front plate, and a main circuit board attached intermediate said back plate and front plate.

16. Method for assisting the installation of a base station for indoor use in a WCDMA network, which base station comprises a support unit including a separately field replaceable power supply unit, and a complete base station unit mechanically supported by said support unit, comprising the steps of:

mechanically attaching said support unit to a support structure;

mechanically attaching the complete base station by releasably hanging the complete base station on and from said support unit;

mechanically docking said complete base station unit as a separate docking unit into the support unit by engaging cooperating snap locking means arranged in said support unit and said complete base station unit enabling secure assembly of the complete base station unit preventing the complete base station unit from inadvertent movement during installation/removal on the field eliminating further fastening means;

connecting the complete base station unit to a radio network controller, RNC, of said network, to an antenna, and to said power supply unit; and downloading application software and office data from a management tool to said complete base station unit, allowing the establishment of a communication channel between said complete base station unit and said RNC;

wherein said power supply unit housed in said support unit comprises an AC/DC converter feeding said complete base station unit with a DC-voltage;

wherein said base station unit has a sandwich structure comprising a rigid metal back plate, a rigid metal front plate, and a main circuit board attached intermediate said back plate and front plate.

17. The method according to claim 16 wherein said step of mechanically attaching said complete base station unit to the support unit comprises the following steps:

engaging hanger members of said complete base station unit with cooperating support members of said support unit, and, pivoting said complete base station unit into engagement of cooperating snap locking means arranged in said support unit and said complete base station unit.

18. The method according to claim 16 further comprising the steps of:

connecting an external alarm equipment to said base station unit, downloading specific software for said external alarm equipment to the control block unit of said base station unit, allowing the establishment of a communication channel between said alarm equipment and a central alarm station.

19. The method as recited in claim 16, comprising the step of:

connecting said management tool directly to said base station unit by means of a Local Management Tool, for direct downloading of said application software and office data to the base station unit.

20. The method as recited in claim 16, comprising the step of:

connecting said management tool to a central radio network controller, RNC, of said network, for downloading of said application software and office data to the base station through said network.

* * * * *